(12) United States Patent
Tester

(10) Patent No.: US 10,710,441 B2
(45) Date of Patent: Jul. 14, 2020

(54) VEHICLE PROTECTIVE COVERING SYSTEM AND METHOD

(71) Applicant: Kathleen Lee Ann Tester, Calgary (CA)

(72) Inventor: Kathleen Lee Ann Tester, Calgary (CA)

(*) Notice: Subject to any disclaimer, the term of this patent is extended or adjusted under 35 U.S.C. 154(b) by 0 days.

(21) Appl. No.: 15/957,902

(22) Filed: Apr. 19, 2018

(65) Prior Publication Data

US 2018/0236859 A1  Aug. 23, 2018

Related U.S. Application Data

(63) Continuation-in-part of application No. 15/284,778, filed on Oct. 4, 2016, now abandoned.

(51) Int. Cl.
*B60J 11/04* (2006.01)
*E04H 15/06* (2006.01)

(52) U.S. Cl.
CPC .............. *B60J 11/04* (2013.01); *E04H 15/06* (2013.01)

(58) Field of Classification Search
CPC ........... E04H 15/02; E04H 15/06; B60J 11/04
USPC ............................................ 135/88.05, 88.06
See application file for complete search history.

(56) References Cited

U.S. PATENT DOCUMENTS

| | | | | |
|---|---|---|---|---|
| 1,836,060 A * | 12/1931 | Lawrence | ............... | E04H 15/06 135/160 |
| 2,508,757 A * | 5/1950 | Gray | ........................ | B60J 11/00 135/140 |
| 3,656,724 A * | 4/1972 | Greenhalgh | ............ | E04H 15/06 296/159 |
| 3,870,061 A * | 3/1975 | Lowery | .................... | E04H 15/06 135/140 |
| 4,655,236 A * | 4/1987 | Dorame | .................. | E04H 6/025 135/88.06 |
| 5,040,557 A | 8/1991 | Morgan | | |
| 5,197,503 A * | 3/1993 | Chen | ........................ | B60J 11/00 135/151 |
| 5,522,409 A * | 6/1996 | May | ......................... | B60J 11/00 135/126 |
| 5,579,796 A * | 12/1996 | Mallo | ...................... | E04H 6/025 135/117 |
| 5,664,825 A | 9/1997 | Henke | | |
| 5,700,048 A * | 12/1997 | Wade | ...................... | B60P 3/343 135/88.05 |
| 6,257,259 B1 * | 7/2001 | Ardouin | ................... | B60J 11/08 135/88.07 |

(Continued)

FOREIGN PATENT DOCUMENTS

| | | |
|---|---|---|
| CN | 101108585 | 1/2008 |
| DE | 3629426 | 3/1988 |

(Continued)

*Primary Examiner* — David R Dunn
*Assistant Examiner* — Danielle Jackson
(74) *Attorney, Agent, or Firm* — Argus Intellectual Enterprise; Jordan Sworen; Daniel Enea

(57) ABSTRACT

A Hail Veil is a hail protection device that attaches to the strongest areas of a vehicle frame to support four rods; one at the very front of the car, one at the back of the car and two on the roof. Mesh is then strategically attached to the front, top, back and sides of the vehicle and fastened to create a barrier to the hail. The Hail Veil is portable and fits into the trunk of the vehicle for quick access.

17 Claims, 5 Drawing Sheets

(56) References Cited

U.S. PATENT DOCUMENTS

| | | | |
|---|---|---|---|
| 7,172,234 B2* | 2/2007 | Chang | F16B 7/1445 |
| | | | 135/88.08 |
| 7,240,684 B2* | 7/2007 | Yang | B60J 7/11 |
| | | | 135/88.07 |
| 7,699,380 B2 | 4/2010 | Coleman | |
| 8,960,212 B2 | 2/2015 | Majer | |
| 9,302,572 B2 | 4/2016 | Wang | |
| 2007/0272335 A1 | 11/2007 | Sánchez | |
| 2009/0072578 A1* | 3/2009 | Wang | B60J 11/06 |
| | | | 296/136.12 |
| 2014/0238455 A1* | 8/2014 | Majer | B60J 11/00 |
| | | | 135/88.05 |
| 2016/0075222 A1* | 3/2016 | Chen | B60J 11/02 |
| | | | 160/239 |

FOREIGN PATENT DOCUMENTS

| | | |
|---|---|---|
| DE | 202005012233 | 3/2006 |
| EP | 1522446 | 4/2005 |
| WO | 2015121694 | 8/2015 |
| WO | 2016042472 | 3/2016 |

* cited by examiner

VEHICLE PROTECTIVE COVERING SYSTEM AND METHOD

CROSS-REFERENCE TO RELATED APPLICATION

The present application is a continuation in part of and is related to and claims priority from pending U.S. Non-Provisional patent application Ser. No. 15/284,778, filed Oct. 4, 2016 which application is incorporated herein by reference.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of car covers and more specifically relates to vehicle hail damage protection.

2. Description of Related Art

Car covers are generally used to protect vehicles from natural elements both indoors and outdoors. Elements such as dust and finger prints can develop on the exterior surfaces of a vehicle stored in a garage. Vehicles stored outdoors are subject to many other elements. Quite often the outdoor elements are much more severe ranging from the harmful effects of the sun's ultra violet rays to extreme weather conditions. Many car covers on the market today are only suited for protecting a vehicle from more moderate conditions such as the sun and wind. These covers are not effective against extreme weather conditions. In many areas it is common to have extreme weather such as sleet and hail that can be extremely damaging to a vehicle's glass and exterior surfaces and often times rendering the vehicle a total loss.

Several attempts have been made to solve the above-mentioned problems such as those found in European. Pat. No. EP1522446A1 to Majer Edoardo relates to a protective car cover. The described protective shield for cars against hail includes a new anti-hail protection for cars comprising a structure composed of a central rod having at each end two diverging rods, pointing towards the corners of the car, and one or more pairs of side rods joined to a close-meshed net. The central rod rests on bottom brackets equipped with suckers or magnets for applying it on the roof of the car.

BRIEF SUMMARY OF THE INVENTION

In view of the foregoing disadvantages inherent in the known car cover art, the present disclosure provides a novel vehicle protection device. The general purpose of the present disclosure, which will be described subsequently in greater detail, is to provide a car covering device for protection against hail and other environmental damage.

A hail veil is disclosed herein. The hail veil is a collapsible protective vehicle covering system comprising: a collapsible protective vehicle covering assembly including a shroud defined by a top-surface comprising an isolator, a bottom-surface, and a thickness, at least one collapsible mount assembly. The at least one collapsible mount assembly comprises at least one mounting point, at least one collapsible horizontal bar and at least one telescopic vertical support The shroud in preferred embodiments comprises mesh; wherein the shroud is configured of an impact resistant screen material. The shroud comprises a first-wall, a second-wall, a third-wall, and a fourth-wall, all joined via a top-wall.

In preferred embodiments there are exactly four of the at least one collapsible mount assemblies; wherein each of the collapsible mount assemblies includes a collapsible horizontal bar, wherein each of the collapsible mount assemblies includes exactly two vertical supports, wherein the exactly two vertical supports may be sectional. The collapsible protective vehicle covering assembly, when mounted, provides an air-space above and partially around the vehicle. The at least one collapsible mount assembly preferably comprises a t-configuration.

The collapsible protective vehicle covering assembly may further comprise straps for removable coupling of the shroud to the vehicle. The at least one collapsible mount assembly is structured and arranged for placement adjacent a vehicle and further structured and arranged to support the shroud above and around a vehicle-top and top-sides of the vehicle. Relationally speaking, bottom-surface is located nearest the vehicle when used. The top-surface and the bottom-surface are joined via the thickness; wherein the top-surface comprising an isolator which provides an isolating means for the vehicle from damaging effects of inclement weather and hail damage. The at least one collapsible mount assembly, as such, is removably couplable to a frame of the vehicle and portable when collapsed.

The collapsible protective vehicle covering system further comprises a set of instructions, and a storage bag. The collapsible protective vehicle covering system is arranged as a kit.

A method of removably securing a collapsible protective vehicle covering system is also disclosed herein; the method comprising the steps of: removing the collapsible protective vehicle covering from a storage bag, unfolding a shroud, erecting a collapsible mount assembly, attaching the collapsible mount assembly to a vehicle frame, applying (installing) the shroud over the collapsible mount assembly, and securing the collapsible protective vehicle covering system to the vehicle with the straps.

The method may further comprise the steps of: removing the collapsible protective vehicle covering system by releasing the straps, removing the shroud from the collapsible mount assembly, removing the collapsible mount assembly from the vehicle frame, collapsing the collapsible mount assembly, folding the shroud, and placing the collapsible protective vehicle covering system in a storage bag. The method may also include adjusting the device to fit the host vehicle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a collapsible protective vehicle covering system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a protective car cover and more particularly to a collapsible protective vehicle covering system as used to improve the protection of a vehicle against hail damage.

Generally, the 'Hail Veil' is a hail protection device that attaches to the strongest areas of a vehicle frame to support four rods; one at the very front of the car, one at the back of the car and two on the roof. Mesh is then strategically attached to the front, top, back and sides of the vehicle and fastened to create a barrier to the hail. The hail veil is portable and fits into the trunk of the vehicle for quick access.

Figure 1:
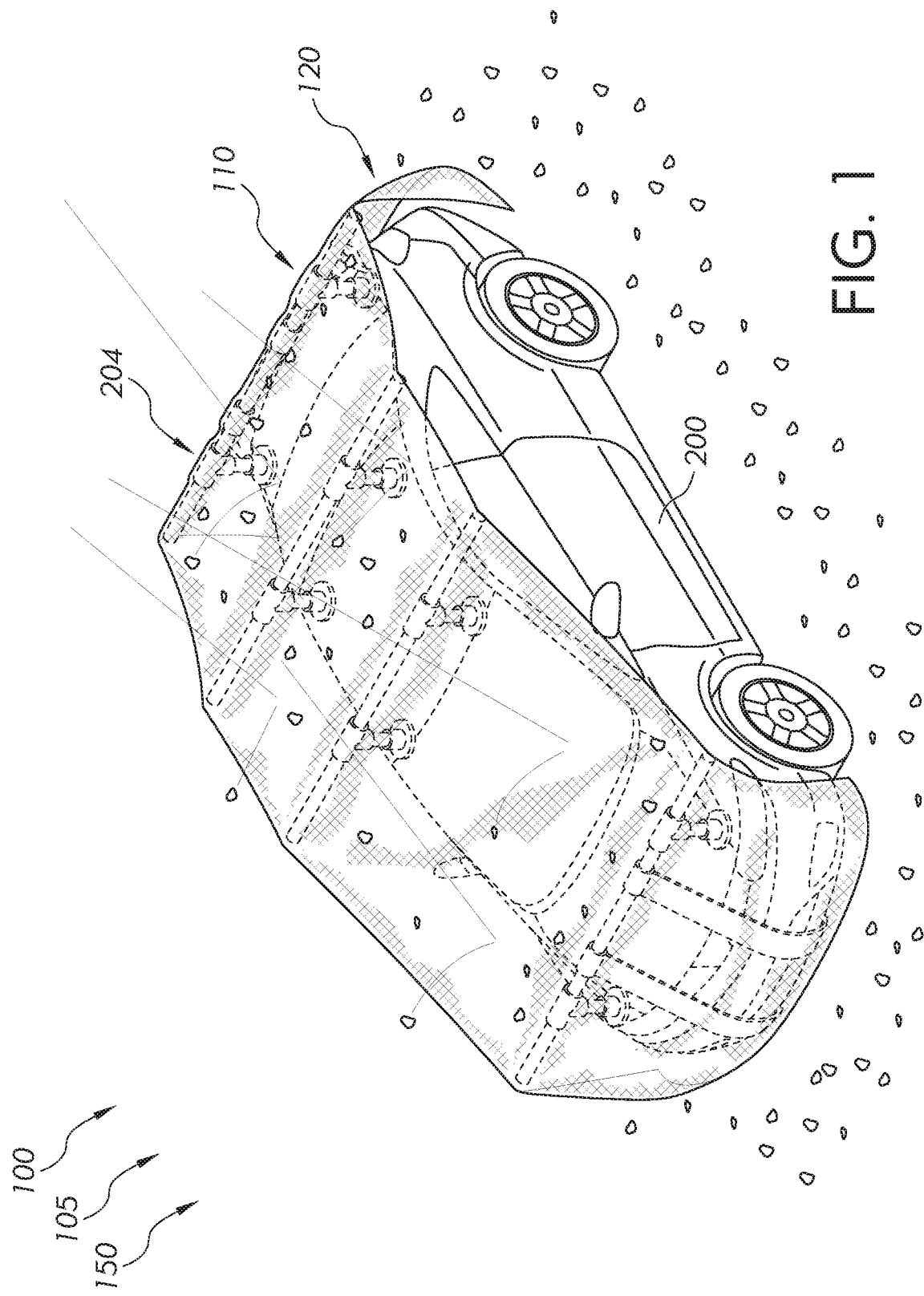
FIG. 1 is a perspective view of the collapsible protective vehicle covering system during an 'in-use' condition, according to an embodiment of the disclosure.
Figure 2:
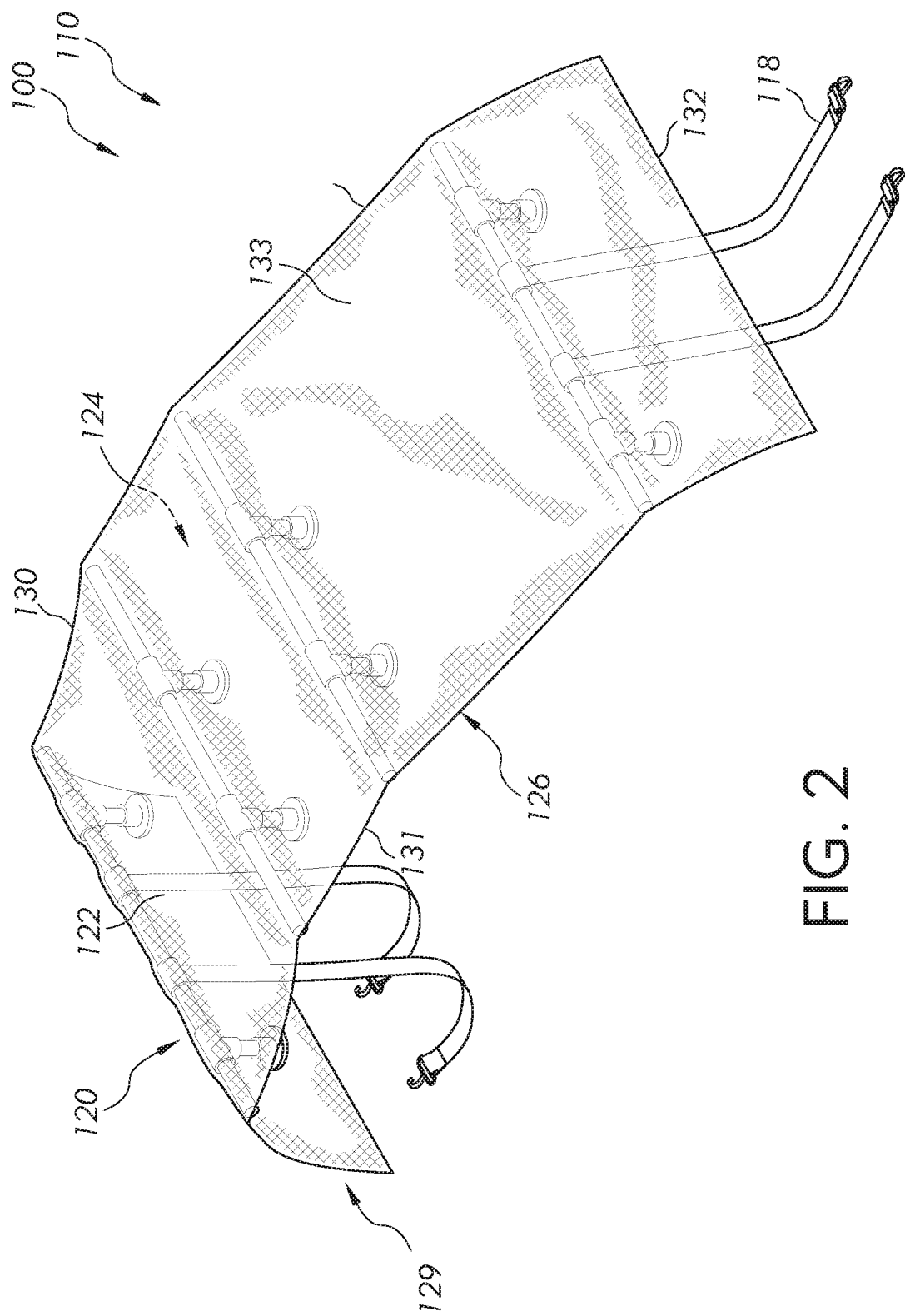
FIG. 2 is a perspective view of the collapsible protective vehicle covering system of FIG. 1, according to an embodiment of the present disclosure.
Figure 3:
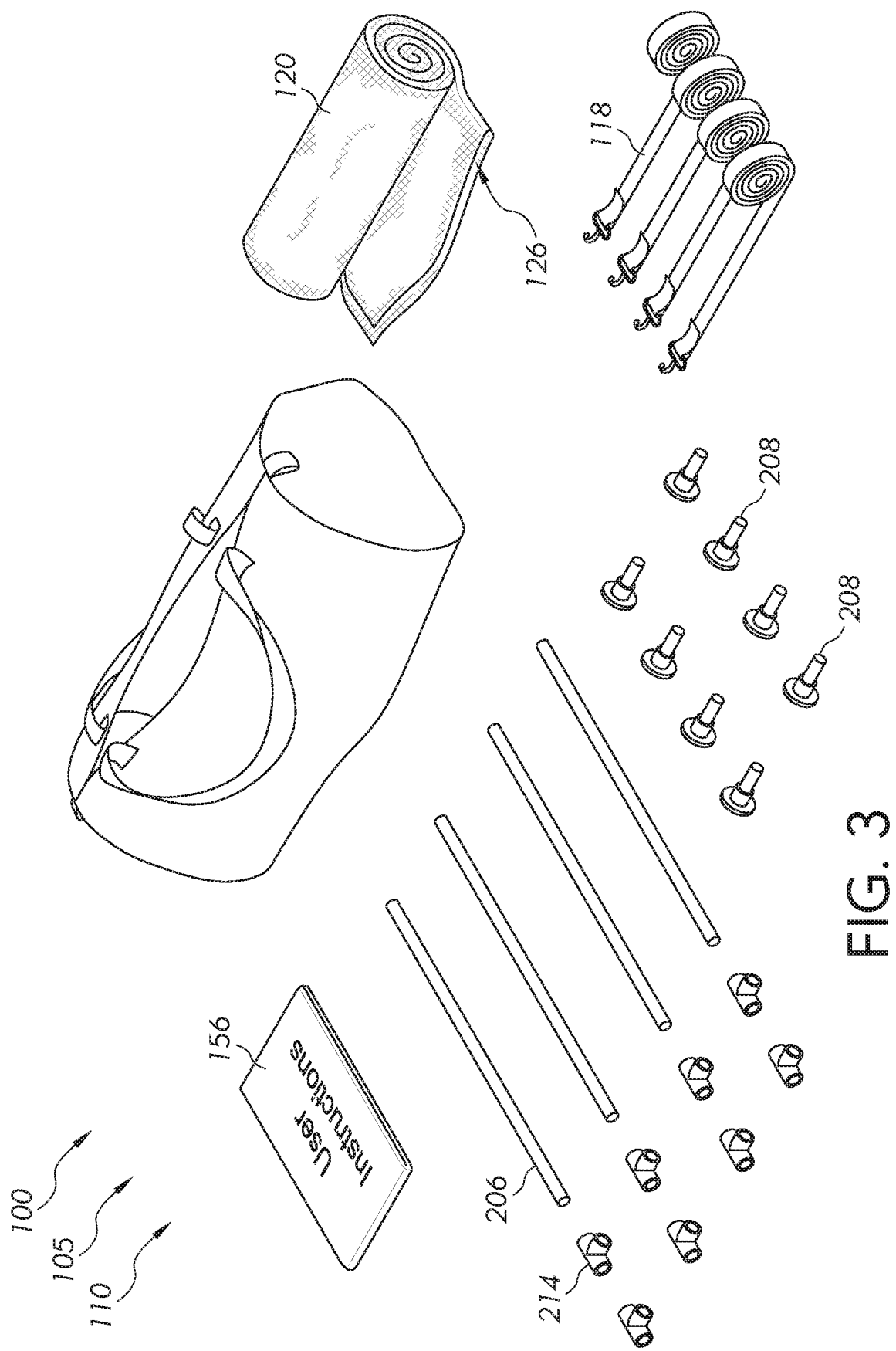
FIG. 3 is a perspective view of the collapsible protective vehicle covering assembly of FIG. 1, according to an embodiment of the present disclosure.
Figure 4:
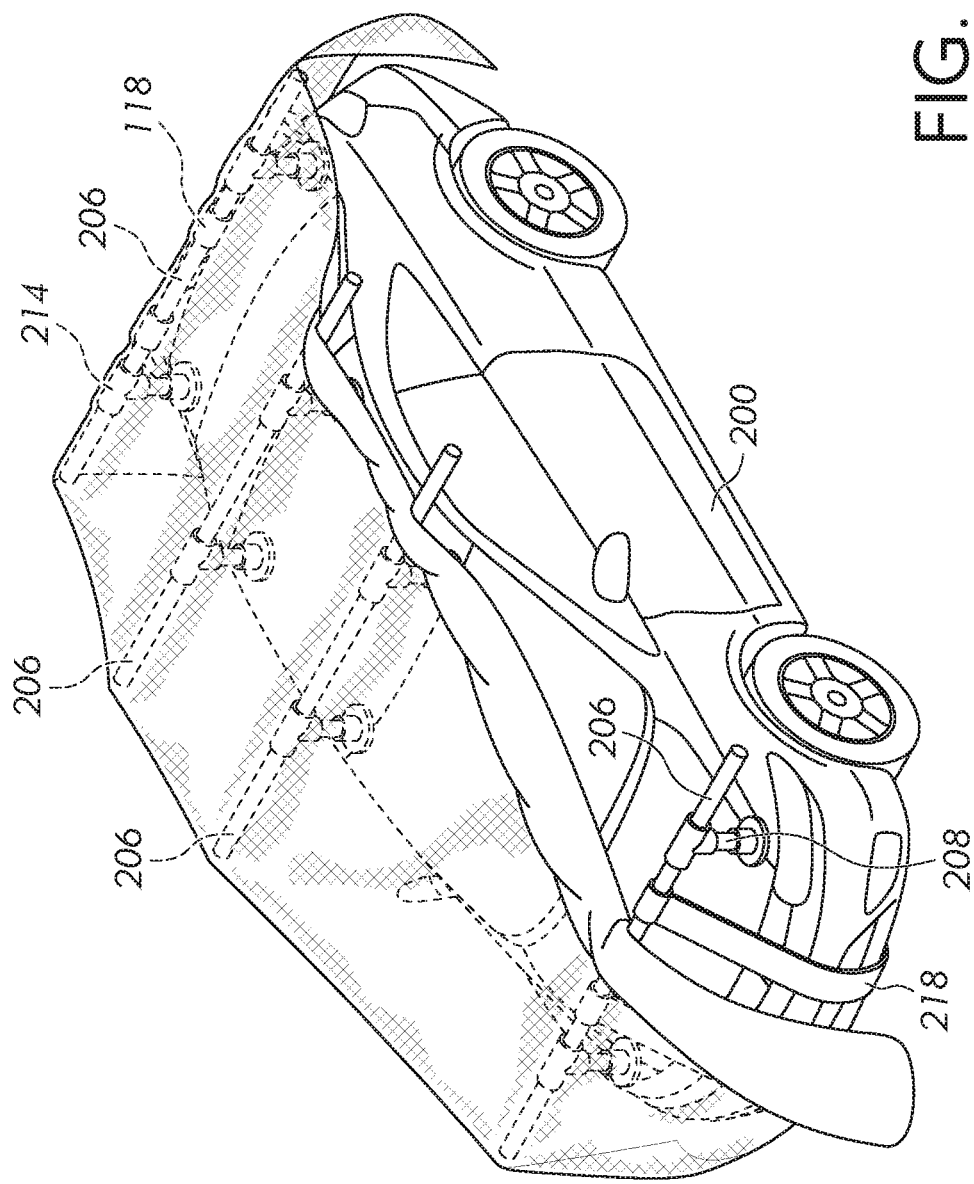
FIG. 4 is a perspective view of the collapsible protective vehicle covering assembly of FIG. 1, according to an embodiment of the present disclosure.

Referring now more specifically to the drawings by numerals of reference, there is shown in FIGS. 1-4, various views of collapsible protective vehicle covering system 100. FIG. 1 shows collapsible protective vehicle covering system 100 during an 'in-use' condition 150, according to an embodiment of the present disclosure. Here, the collapsible protective vehicle covering system 100 may be beneficial for use to protect a vehicle 200 from hail and other environmental weather damage.

Collapsible protective vehicle covering system 100 comprises: collapsible protective vehicle covering assembly 110 including shroud 120; (shroud 120 defined by top-surface 122 comprising an isolator, bottom-surface 124, and thickness 126), and at least one collapsible mount assembly 204 comprising at least one mounting point, at least one collapsible horizontal bar and at least one telescopic vertical support. Referring now to shroud 120; shroud 120 preferably comprises mesh but may comprise other fabrics and/or materials in alternate embodiments. Shroud 120 is preferably configured of an impact resistant screen material. Collapsible mount assembly 204 is placed adjacent vehicle 200 to support shroud 120 above and around a vehicle-top and top-sides of vehicle 200, as shown. Bottom-surface 124 is structured and arranged for placement nearer the vehicle 200 when used as compared to placement of said top-surface 122 and said thickness 126.

Top-surface 122 and bottom-surface 124 are mechanically joined with the thickness 126; wherein top-surface 122 comprising an isolator. The top-surface 122 is structured and arranged with the isolator for isolating the vehicle 200 from damaging effects of inclement weather and hail damage. The at least one collapsible mount assembly 204 is structured and arranged with the bottom-surface 124 for removably coupling the collapsible protective vehicle covering assembly 110 to a frame of said vehicle 200. The present invention may be coupled to the frame or other suitable mounting point via straps 118, hooks, or any other suitable means for anchoring.

Referring now again to shroud 120; shroud 120 comprises first-wall 129, second-wall 130, third-wall 131, and fourth-wall 132. Shroud 120 also comprises top-wall 133, as shown in FIG. 1.

Collapsible mount assembly 204, in preferred embodiments, comprises exactly four of the at least one collapsible mount assemblies 204; wherein each of collapsible mount assembl(ies) 204 includes collapsible horizontal bar 206 and each of collapsible mount assembl(ies) 204 preferably includes exactly two vertical supports 208. The exactly two vertical supports 208 are collapsible. The exactly two vertical supports 208 are sectional and/or telescopic.

Collapsible protective vehicle covering assembly 110 of said "exactly four" collapsible mount assemblies, when mounted provides an air-space above and partially around vehicle 200 also includes at least one t-configuration 214. Collapsible protective vehicle covering assembly 110 further comprises straps 118 for removable coupling of shroud 120 to vehicle 200.

According to one embodiment, collapsible protective vehicle covering system 100 may be arranged as a kit 105. In particular, collapsible protective vehicle covering system 100 may further include a set of instructions 156. Instructions 156 may detail functional relationships in relation to the structure of collapsible protective vehicle covering system 100 (such that collapsible protective vehicle covering system 100 can be used, maintained, or the like, in a preferred manner without damaging vehicle 200).

Figure 5:
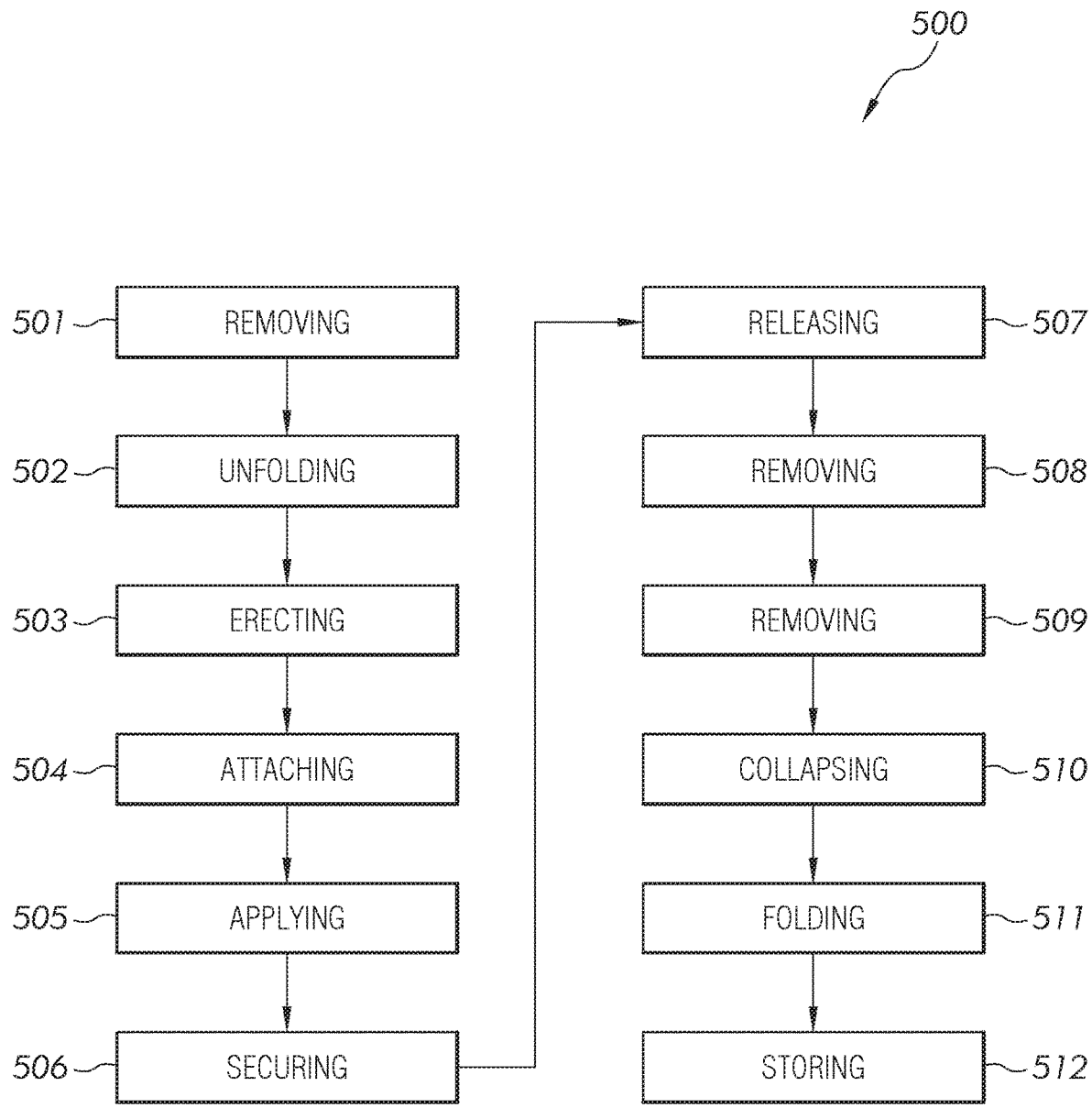
FIG. 5 is a flow diagram illustrating a method of use for the collapsible protective vehicle covering system, according to an embodiment of the present disclosure.

FIG. 5 is a flow diagram illustrating a method 500 for using collapsible protective vehicle covering system 100, according to an embodiment of the present disclosure. In particular, the method of use 500 may include one or more components or features of the collapsible protective vehicle covering system 100 as described above. As illustrated, the method 500 for using collapsible protective vehicle covering system 100 may include the steps of: step one 501, removing collapsible protective vehicle covering assembly 110 from a storage bag; step two 502, unfolding shroud 120; step three 503, erecting collapsible mount assembly 204; step four 504 attaching collapsible mount assembly 204 to vehicle (200) frame; step five 505 applying shroud 120 over collapsible mount assembly 204; step six 506 securing collapsible protective vehicle covering system 100 to vehicle 200 with straps 118 (the above mentioned steps for installation); step seven 507 removing collapsible protective vehicle covering assembly 110 of collapsible protective vehicle covering system 100 by releasing straps 118; step eight 508 removing shroud 120 from collapsible mount assembly 204; step nine 509 removing collapsible mount assembly 204 from vehicle frame; step ten 510 collapsing collapsible mount assembly 204; step eleven 511 folding shroud 120; and step twelve 512 placing collapsible protective vehicle covering assembly 110 of collapsible protective vehicle covering system 100 in a storage bag (the above mentioned steps after installation for removal and portable storage).

It should be noted that step twelve 512 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for use and installation (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A collapsible protective vehicle covering system, comprising:
    a collapsible protective vehicle covering assembly including:
        a shroud comprising a bottom surface and a top surface, wherein the shroud is configured to removably cover a first and a second collapsible mount assembly;
        the first and the second collapsible mount assemblies each comprising
            at least one mounting point having a surface configured to rest against a vehicle body,
            a collapsible horizontal bar,
            a first and a second vertical support,
            a first strap and a second strap each extending perpendicular to the horizontal bar and between the first and the second vertical supports;
    wherein each of the first and the second collapsible mount assemblies is structured and arranged for placement adjacent a vehicle and further structured and arranged to support said shroud both above and around a vehicle-top and top-sides of said vehicle;
    wherein said bottom surface faces toward the vehicle; and
    wherein said top surface faces away from the vehicle; and
    the first and second collapsible mount assemblies supports the shroud above the vehicle;
    wherein the first collapsible mount assembly is disposed on a hood of the vehicle body and the second collapsible mount assembly is disposed on the trunk of the vehicle body when the collapsible protective vehicle covering system is in a mounted configuration.

2. The collapsible protective vehicle covering system of claim 1, wherein the shroud has an impact resistant screen material.

3. The collapsible protective vehicle covering system of claim 2, wherein the shroud comprises a first panel.

4. The collapsible protective vehicle covering system of claim 3, wherein the shroud comprises a second panel.

5. The collapsible protective vehicle covering system of claim 4, wherein the shroud comprises a third panel.

6. The collapsible protective vehicle covering system of claim 5, wherein the shroud comprises a fourth panel.

7. The collapsible protective vehicle covering system of claim 1, further comprising a third and fourth collapsible mount assembly such that the collapsible protective vehicle covering system comprises exactly four collapsible mount assemblies.

8. The collapsible protective vehicle covering system of claim 7, wherein the first and second vertical supports are telescopic.

9. The collapsible protective vehicle covering system of claim 1, wherein said collapsible protective vehicle covering assembly, when mounted, provides an air-space above and partially around said vehicle.

10. The collapsible protective vehicle covering system of claim 1, wherein each of the first and second collapsible mount assemblies further comprise at least one T-Joint, each of the at least one T-Joint having three receptacles, each of the three receptacles having an inner diameter dimensioned to accept and frictionally retain the collapsible horizontal bar.

11. The collapsible protective vehicle covering system of claim 1, wherein opposing ends of the shroud extending distally beyond the first and second collapsible mount assembly are free and not fixed directly to the vehicle.

12. The collapsible protective vehicle covering system of claim 1, wherein opposing lateral sides of the shroud are not secured to the vehicle body in a mounted configuration.

13. The collapsible protective vehicle covering system of claim 1, wherein the first and second strap extend directly from the horizontal bar and are each capable of rotating about the horizontal bar.

14. A collapsible protective vehicle covering system for covering a vehicle, comprising:
    a collapsible protective vehicle covering assembly including:
        a shroud comprising a bottom surface and a top surface, wherein the shroud is configured to removably cover a first and a second collapsible mount assembly;
        the first and the second collapsible mount assemblies each comprising
            at least one mounting point having a surface configured to rest against a vehicle body,
            a collapsible horizontal bar,
            a first and a second telescopic vertical support,
            a first strap and a second strap each extending perpendicular to the horizontal bar and between the first and the second telescopic vertical supports;
    wherein the shroud is configured of an impact resistant screen material; wherein the shroud comprises a first panel;
    wherein the shroud comprises a second panel;
    wherein the shroud comprises a third panel;
    wherein the shroud comprises a fourth panel;
    wherein the shroud comprises a top panel;
    wherein said collapsible protective vehicle covering assembly, when mounted, provides an air-space above and partially around said vehicle;
    wherein said bottom surface faces toward the vehicle;
    wherein said top surface faces away from the vehicle;

wherein the first collapsible mount assembly is disposed on a hood of the vehicle body and the second collapsible mount assembly is disposed on the trunk of the vehicle body when the collapsible protective vehicle covering system is in a mounted configuration.

15. The collapsible protective vehicle covering system of claim 14, further comprising a set of instructions, and a storage bag:
    wherein the collapsible protective vehicle covering system is arranged as a kit.

16. A method of removably securing a collapsible protective vehicle covering system to a vehicle comprising:
    erecting a first and second collapsible mount assembly, wherein each of the first and second collapsible mount assemblies comprise a collapsible horizontal bar, a first and a second vertical support;
    attaching the first collapsible mount assembly to a hood of the vehicle;
    attaching the second collapsible mount assembly to a trunk of the vehicle;
    applying a shroud over the first and second collapsible mount assemblies;
    securing the collapsible protective vehicle covering assembly to the vehicle with a pair of straps, wherein the pair of straps each extend perpendicular to the horizontal bar and between the first and the second vertical supports of the first collapsible mount assembly.

17. The method of claim 16, further comprising:
    removing said collapsible protective vehicle covering assembly by releasing said straps;
    removing said shroud from said collapsible mount assembly;
    removing said first and second collapsible mount assemblies from said vehicle;
    collapsing said first and second collapsible mount assemblies;
    folding said shroud; and
    placing said collapsible protective vehicle covering assembly in a storage bag.

* * * * *